(12) United States Patent
Kraetzl

(10) Patent No.: US 6,448,789 B1
(45) Date of Patent: Sep. 10, 2002

(54) DETECTOR DEVICE

(75) Inventor: Juergen Kraetzl, Althegnenberg (DE)

(73) Assignee: W.E.T. Automotive System, AG Aktiengesellschaft, Odelzhausen (DE)

( * ) Notice: Subject to any disclaimer, the term of this patent is extended or adjusted under 35 U.S.C. 154(b) by 17 days.

(21) Appl. No.: 09/722,809

(22) Filed: Nov. 27, 2000

(30) Foreign Application Priority Data

Nov. 24, 1999 (DE) .......................................... 199 56 545

(51) Int. Cl.[7] .............................................. G01R 27/26
(52) U.S. Cl. ...................................... 324/658; 324/661
(58) Field of Search ................................ 324/658, 661, 324/649, 663, 671, 691; 73/172

(56) References Cited

U.S. PATENT DOCUMENTS

| | | | | |
|---|---|---|---|---|
| 5,878,620 A | * | 3/1999 | Gilbert et al. | ................ 73/172 |
| 5,891,306 A | * | 4/1999 | Chase et al. | ............ 324/664 X |
| 5,914,610 A | * | 6/1999 | Gershenfeld et al. | ........ 324/663 |
| 5,936,411 A | * | 8/1999 | Jacobsen et al. | ............ 324/662 |
| 5,971,432 A | * | 10/1999 | Gagnon et al. | ............. 280/735 |
| 6,087,837 A | * | 7/2000 | Chase | ........................ 324/693 |
| 6,283,504 B1 | * | 9/2001 | Stanley et al. | .............. 280/735 |

FOREIGN PATENT DOCUMENTS

DE    198 26 391 A1    12/1999

* cited by examiner

*Primary Examiner*—N. Le
*Assistant Examiner*—T. R. Sundaram
(74) *Attorney, Agent, or Firm*—Dinnin & Dunn, P.C.

(57) ABSTRACT

The present invention concerns a detector for detecting seat occupancy with at least two flat electrodes and a separating medium that separates the two electrodes from each other. The invention provides that the separating medium (3) has at least one spacing zone (4) and one deformation zone (5), which has a greater compressibility than the spacing zone (4).

Figure 1:
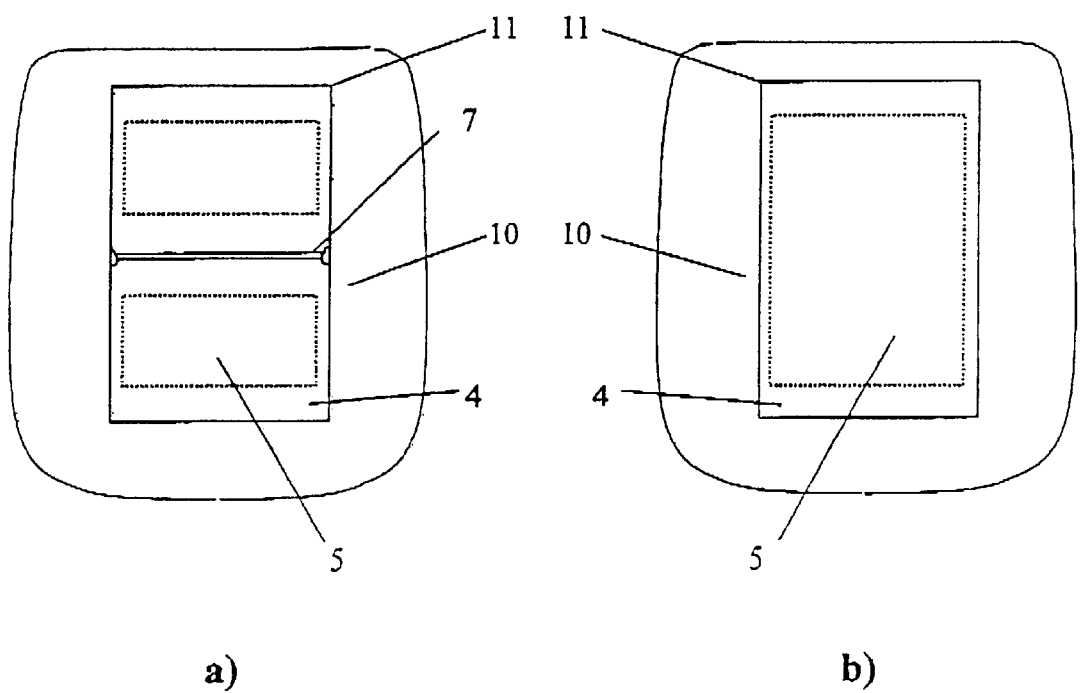

16 Claims, 1 Drawing Sheet a)                              b)

DETECTOR DEVICE

BACKGROUND OF THE INVENTION

1. Field of the Invention

The present invention concerns a detector for detecting seat occupancy with at least two flat electrodes and a separating medium that separates the two electrodes from each other.

2. Description of Related Art

State-of-the-art detectors are installed, for example, on the support surface of a car seat to detect whether the seat is occupied, e.g., for the purpose of controlling airbags or seat heaters.

When state-of-the-art detectors are installed in car seats, it is often unavoidable that seams pass over the detectors. In addition, the edges of the detectors are often subject to pressure loads when covered with a seat cover. This calls into question the reliability of the measurement, since there is already a tendency in the preloaded regions to detect the seat as occupied.

SUMMARY OF THE INVENTION

Uniform responsiveness of the detector over its entire surface is ensured by providing at least one spacing zone and one deformation zone, which has greater compressibility than the spacing zone.

A configuration that is especially easy to produce is obtained when the deformation zone has at least one recess. This recess may run perpendicular or parallel to at least one of the electrodes. It may take the form of a hole, a channel that is open or closed all around, or a groove.

It may be advantageous if the separating medium is at least partially provided with reinforcing agents. Suitable reinforcing agents include rubber reinforcement or additional sheeting.

The different zones may be made from the same or different materials.

It is advisable for the separating medium to consist at least partially of foam material, knitted or woven textile materials, silicone or rubber. In addition, it should be flat and nonconducting.

BRIEF DESCRIPTION OF THE DRAWING(S)

The following description concerns possibilities for developing the invention. These specifications are intended only as examples and are given with reference to:

FIG. 1a surface of a seat with a detector in top view

FIG. 1b second embodiment of a seat surface in top view

Figure 2:
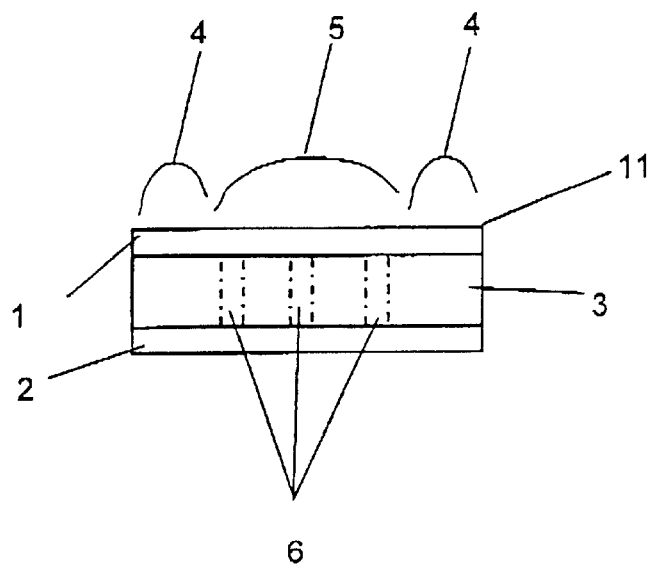

FIG. 2 ross section through a detector of FIG. 1.

DESCRIPTION OF THE PREFERRED EMBODIMENT(S)

FIGS. 1a and 1b show a seat surface 10 with a detector 11 installed on it. As shown in FIG. 2, this detector has a separating medium 3, which separates two electrodes 1 and 2 from each other.

The separating medium 3 of the detector 11 has a spacing zone 4 and a deformation zone 5.

The separating medium 3 has a lower compressibility in the spacing zone 4 than in the deformation zone 5. In this way, a prestress resulting from seams 7 or a seat covering is opposed by an increased resistance.

The separating medium 3 has a higher compressibility in the deformation zone 5. In this way, a load acting on the surface of the seat is opposed by less resistance. That is, greater deformation is produced by the same load.

The higher compressibility is preferably produced by systematic weakening of the material in the deformation zone 5. This can be accomplished by perforations or recesses 6 of any desired type.

It is also possible to reinforce the spacing zone 4 by application of additional reinforcing agents. For example, it would be possible to impregnate the separating medium with rubber to stiffen it. The insertion or application of additional sheeting is a possible supplementary or alternative measure.

What is claimed is:

1. A detector for detecting seat occupancy with at least two flat electrodes and a separating medium separating the two electrodes, wherein the separating medium has at least one space zone and one deformation zone which has greater compressibility than the spacing zone, said deformation zone has at least one recess, said recess is arranged parallel to at least one of the electrodes.

2. The detector in accordance with claim 1 wherein the recess has the form of a hole, a channel that is open or closed all around, or a groove.

3. The detector in accordance with claim 1, wherein the zones are made from the same material.

4. The detector in accordance with claim 1, wherein the zones are made from different materials.

5. The detector in accordance with claim 1, wherein the separating medium is provided at least partially with reinforcing agents.

6. The detector in accordance with claim 5, wherein a rubber reinforcement or additional sheeting is used as reinforcement.

7. The detector in accordance with claim 1, wherein the separating medium consists at least partially of knitted or woven textile materials, silicone or rubber.

8. A detector used in a vehicle seat for detecting an occupant of the vehicle seat, said detector including:
   at least two electrodes near a surface of the seat; and
   a separating medium located between said at least two electrodes, said separating medium having at least one spacing region and one deformation region, said spacing region having a lower compressibility than said deformation region, said spacing region and said deformation region are made of a different material, said deformation region having at least one orifice, said orifice is parallel to said electrodes.

9. The detector of claim 8, wherein said separating mechanism includes at least partially a reinforcing agent.

10. The detector of claim 8 wherein said separating member consists at least partially of knitted or woven textiles, silicone, or rubber materials.

11. A detector system for use in the seat of a vehicle, and comprising:
    at least two relatively flat electrodes,
    a separating member between said electrodes, said separating member contains at least one reinforcing material;

said separating member having at least one spacing zone and at least one deformation zone, said deformation zone being more compressible than said spacing zone to oppose a prestress in the seat by an increased resistance, said deformation zone has at least one recess.

12. The detector of claim 11 wherein at least one said recess is oriented perpendicular to one of said electrodes.

13. The detector of claim 11 wherein at least one said recess is oriented parallel to one of said electrodes.

14. The detector of claim 11 wherein said separating member includes at least one material from the group consisting of a foam material, a woven material, a knitted material, a silicone material, an elastomeric material, and a rubber material.

15. An automotive seat assembly which includes the detector system of claim 12.

16. An automotive seat assembly which includes the detector system of claim 14.

* * * * *